United States Patent [19]

Bogie et al.

[11] Patent Number: 4,617,506

[45] Date of Patent: Oct. 14, 1986

[54] BATTERY CHARGING APPARATUS AND METHODS

[75] Inventors: Jon R. Bogie, Evanston; Edward A. Quillen, St. Charles, both of Ill.

[73] Assignee: Wiltronix Corporation, Evanston, Ill.

[21] Appl. No.: 646,571

[22] Filed: Aug. 31, 1984

[51] Int. Cl.⁴ .................... H01R 11/00; H02J 7/00; G01N 27/42

[52] U.S. Cl. .................................. 320/2; 320/48; 307/10 R; 340/636

[58] Field of Search ......................... 320/2–5, 320/25, 26, 48; 307/10 R, 10 BP; 340/636

[56] References Cited

U.S. PATENT DOCUMENTS

| | | |
|---|---|---|
| 691,144 | 1/1902 | Hutchison . |
| 1,786,280 | 12/1930 | Woodbridge . |
| 2,392,737 | 1/1946 | Heyer ................................. 320/20 |
| 3,281,816 | 10/1966 | Raymond ........................... 340/249 |
| 3,466,453 | 9/1969 | Greenberg ........................... 307/10 |
| 3,654,538 | 4/1972 | Gardberg ............................. 320/7 |
| 3,746,961 | 7/1973 | Dobie ................................. 320/48 |
| 3,857,082 | 12/1974 | van Opijnen ....................... 320/25 |
| 4,020,414 | 4/1977 | Paredes ............................... 320/48 X |
| 4,027,231 | 5/1977 | Lohrmann ........................... 320/48 X |
| 4,163,186 | 7/1979 | Haley ................................. 340/636 |
| 4,217,533 | 8/1980 | Van Beek ........................... 320/23 |
| 4,238,722 | 12/1980 | Ford .................................. 320/25 |
| 4,355,275 | 10/1982 | Anglin ................................ 320/21 |

OTHER PUBLICATIONS

F. Mims, III, *Engineers Notebook*, 1979 Radio Shack Book, p. 110.

*Primary Examiner*—R. J. Hickey
*Attorney, Agent, or Firm*—Willian Brinks Olds Hofer Gilson & Lione

[57] ABSTRACT

An apparatus and method for recharging a battery in one vehicle from the electrical system of another vehicle, and for determining when that battery has been sufficiently recharged. In one aspect of the invention there is provided circuit means, adapted to be respectively coupled to both the battery and the electrical system of the two vehicles. The circuit means include an array of light emitting diodes, the number and sequence of illumination of the diodes in the array being indicative of the extent to which the battery has been recharged.

11 Claims, 3 Drawing Figures

BATTERY CHARGING APPARATUS AND METHODS

This invention relates to battery charging apparatus and methods, and in particular to an apparatus and method for charging the battery of one vehicle, sometimes referred to as the "charging" vehicle, from the electrical system of another vehicle, sometimes referred to as the "to-be-charged" vehicle. More particularly, the invention relates to an apparatus and method of the type described wherein the battery charging operation utilizes an accessory outlet, such as a vehicle's cigarette lighter, as the means for permitting passage of energy from the charged vehicle to the to-be-charged vehicle.

Many vehicles, particularly automobiles and trucks, utilize a self-contained energy source, typically a battery, to provide sufficient energy to start the engine. Once started, an internal electrical generating system, such as an alternator, ordinarily satisfies the vehicle's electric power requirements. Nonetheless, if the battery become dead or run-down, the engine will not start in the normal manner, the internal generating system being virtually useless for that purpose.

Run-down or dead vehicular batteries are a common, recurring problem, particularly in severely cold weather which has an adverse effect on normal battery operation. One frequently used method for starting a vehicle with a run-down or dead battery involves utilizing a pair of cables which couple the positive and negative terminals of the battery in a charging vehicle to the corresponding terminals of the battery in the vehicle to be started. This, in effect, permits the electrical system of the charging vehicle, such as the alternator, to transfer sufficient energy to the starting system of the other vehicle to start that other vehicle.

Though the use of cables in the manner described has been effective in some applications, it is not without certain problems. For example, it is sometimes difficult to correctly differentiate the positive and negative terminals of the batteries in the charging and the to-be-charged vehicles. If an error is made, serious damage can occur to both vehicles, and there is a potential danger to the persons making the cable connections. Even if the battery terminals can be readily differentiated, the connections typically require the vehicles to be moved into facing relationship and connected outside the vehicles, a task that is sometimes difficult, inconvenient and uncomfortable, particularly in the severely cold weather when such operations are often required.

In view of the foregoing problems, other methods for starting a vehicle with a dead or run-down battery have been suggested. One of these methods includes, connecting the electrical system of the charging vehicle to the electrical system of the vehicle to be charged by means of electrical conductors engageable with an interior accessory outlet, such as a vehicular cigarette lighter. Though these methods have been used successfully, they are also subject to certain drawbacks, deficiencies and inconveniences. For example, in some such methods, it is relatively difficult for the user to determine whether the electrical system in the charging vehicle is operating sufficiently to charge the battery in the vehicle to be charged. Similar difficulties sometimes occur in determining whether the battery in the vehicle to be charged has been sufficiently recharged to start the vehicle.

Accordingly, it is a primary object of this invention to provide an improved method and apparatus for recharging the battery in one vehicle using electrical system of another vehicle. It is another object of this invention to provide an improved method and apparatus for determining whether a battery in a vehicle to be charged has been sufficiently recharged by the electrical system of a charging vehicle. Other objects and features of the invention will be apparent upon reading the detailed description of the invention as summarized below.

SUMMARY OF THE INVENTION

The objects of this invention, are achieved by providing electronic means having inputs adapted to be coupled, respectively, to the battery of the vehicle to be charged and to the electrical system of the charging vehicle. Circuit means are coupled between the inputs of the electronic means and an array of illuminatable display means. In one aspect of the invention, the number of the display means that are illuminated and/or their sequence of illumination is indicative of the extent to which the battery in the vehicle to be charged has been recharged. In this manner the user can readily determine when the battery in the vehicle to be charged has been sufficiently recharged to start the vehicle.

DETAILED DESCRIPTION OF THE DRAWINGS

An exemplary embodiment of the invention summarized above is illustrated by the accompanying drawings wherein.

DETAILED DESCRIPTION OF AN EXEMPLARY EMBODIMENT OF THE INVENTION

Figure 1:
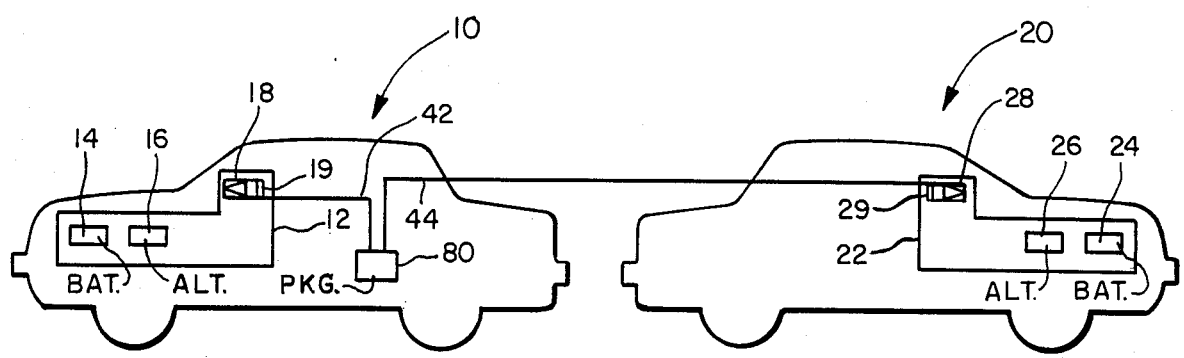
FIG. 1 is a schematic view of a charging vehicle and a vehicle to be charged utilizing the apparatus and methods of the invention.

Referring now to the drawings, and in particular to FIG. 1, there is shown, in schematic form, two vehicles utilizing the apparatus of the invention. More particularly, there is illustrated a charging vehicle 10 and a vehicle to be charged 20. Charging vehicle 10 has an electrical system represented schematically by a Block 12 comprising a battery 14, an alternator 16 and an interior appliance outlet 18 containing, for example, a cigarette lighter 19. The electrical system 12 is conventional in all respects and operates in a well-known manner to start vehicle 10, and to provide electrical energy thereto after the vehicle has been started.

Similarly, FIG. 1 illustrates a to-be-charged vehicle 20 having an electrical system represented by a Block 22. The electrical system 22 is similar to the electrical system 12 in charging vehicle 10. Thus, the electrical system 22 comprises a battery 24, an alternator 26 and an interior accessory outlet 28 containing, for example, a cigarette lighter 29. For purposes of explanation, the to-be-charged vehicle 20 is deemed to have a dead or run-down battery, which is rechargeable from the electrical system of the charging vehicle 10.

Figure 2:
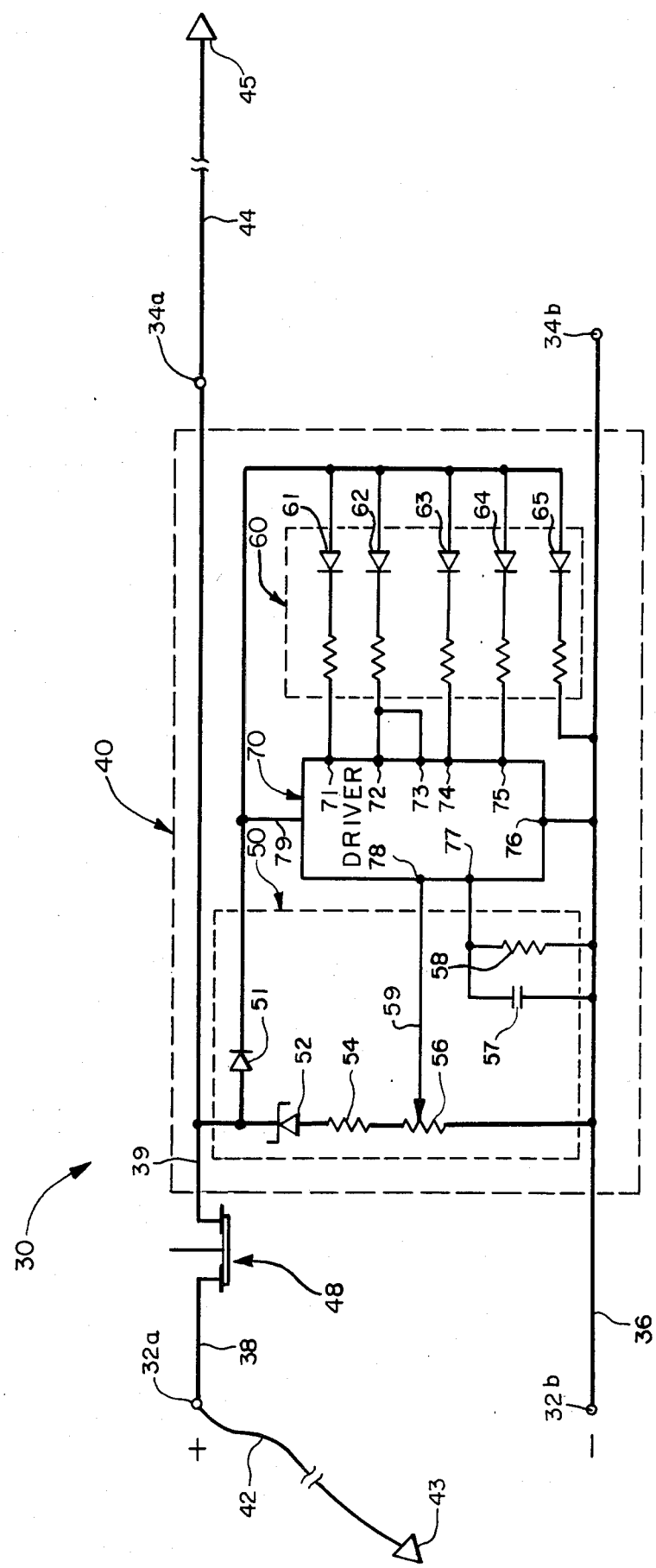
FIG. 2 is an exemplary circuit diagram of apparatus comprising the invention, said apparatus being further useful in carrying out the preferred methods of practicing the invention.

The recharging of the battery 24 in the to-be-charged vehicle 20 is accomplished by electronic means 30, shown in schematic form in FIG. 2. Electronic means 30 include a first pair of inputs 32a, 32b, and a second pair of inputs 34a, 34b. Input 32a is coupled through a conductor 38 via a normally closed switch 48 to a conductor 39. Conductor 39 is, in turn, coupled to input 34a. Electronic means 30 also has another conductor 36 sometimes referred to herein as ground. Extending, respectively, from inputs 32a, 32b are relatively short conductors 42a, 42b, (sometimes collectively referred to as conductor 42) terminating in a plug 43 represented schematically by an arrowhead. Plug 43 is engageable with accessory outlet 18 of the charging vehicle 10. Similarly, relatively long conductors (sometimes collectively referred to as conductor 44) extend, respectively, from inputs 34a, 34b. Conductor 44 terminates in a plug 45 engageable with the accessory outlet 28 in the to-be-charged vehicle 20. When plug 43 is brought into engagement with outlet 18, the electrical system 12 of the charging vehicle 10 is effectively coupled to inputs 32a, 32b. Likewise, when plug 45 is brought into engagement with outlet 28 in the to-be-charged vehicle 20, the electrical system 22, including the battery 24 of the to-be-charged vehicle 20, is effectively coupled to inputs 34a, 34b.

Electronic means 30 further include circuit means 40 which, in turn, includes calibration means 50, display means 60 and driver means 70. Calibration means 50 preferably includes a Zener diode 52 coupled between conductor 39 and a resistor 54, the latter being coupled through a variable resistor 56 to ground. Another resistor 58 and a capacitor 57 are parallely coupled between an input 77 of driver means 70 and ground, and another diode 51 is coupled between conductor 39 and another input 79 of driver means 70. The wiper arm 59 of variable resistor 56 is coupled to yet another input 78 of driver means 70.

Display means 60 preferably comprises a plurality of illuminatable devices in the form of five resistively coupled light emitting diodes 61–65. These diodes 61–65 are preferably aligned in a linear array as shown in FIG. 2. One end of each of diodes 61–65 is coupled to input 79 of driver means 70; the other end of each of diodes 61–64 is coupled, respectively, through its associated resistor to outputs 71, 72, 74 and 75 of driver means 70. Diode 65 is coupled through its associated resistor to ground. Driver means 70 further includes an output 76 which is externally coupled to ground, while outputs 72 and 73 are externally interconnected as shown in FIG. 2.

The preferred parameters or indentification numbers for the various circuit elements comprising circuit means 40 are as follows: Zener diode 52—IN9581; diode 51—IN4001; resistor 54—10 K; resistor 58—10 K; variable resistor 56—500 Ohms; capacitor 57—47.7 Microfarads; Driver means 70—CIC6125E of Electronics Research and Service Organization of Hsinchu Taiwan, Republic of China; the resistors coupled to diodes 61–65—680 Ohms; diodes 61–65—light output of 1 microcandle.

In accordance with well known circuit operation, driver means 70 compares voltage received at its appropriate inputs with its own internally generated voltages, and successively causes illumination of diodes 62–65. Alternatively, the first diode (in this embodiment diode 61) can be illuminated directly from voltage applied at input 79. The calibration means 50, particularly Zener diode 52, shifts the input voltage level at which the second diode (in this embodiment diode 62) is illuminated. Resistors 54 and 56 are selected to determine the relative position of the voltage steps at which the various diodes 61–65 are illuminated. To make a double step between diodes 63 and 64, outputs 72 and 73 are externally coupled as mentioned above.

In this preferred embodiment the specific calibration of the circuit means 40 is accomplished so that diode 61 will illuminate if switch 48 is closed and a minimum of three volts is applied between input 32 and ground (or if a minimum of three volts is applied between input 34 and ground); diode 62 will illuminate if the minimum voltage is between 10.6 and 11.0 Volts; diode 63 will illuminate if the minimum voltage is between 12.0 and 12.2 Volts; diode 64 will illuminate if the minimum voltage is between 13.35 and 13.45 Volts; and diode 65 will illuminate if the minimum voltage is between 15.8 and 16.2 volts. Thus, if three volts are applied in the manner indicated above, diode 61 will light; if 11 volts are so applied, both diode 61 and diode 62 will light; if 12.2 volts are so applied, diodes 61, 62 and 63 will light; etc.

Figure 3:
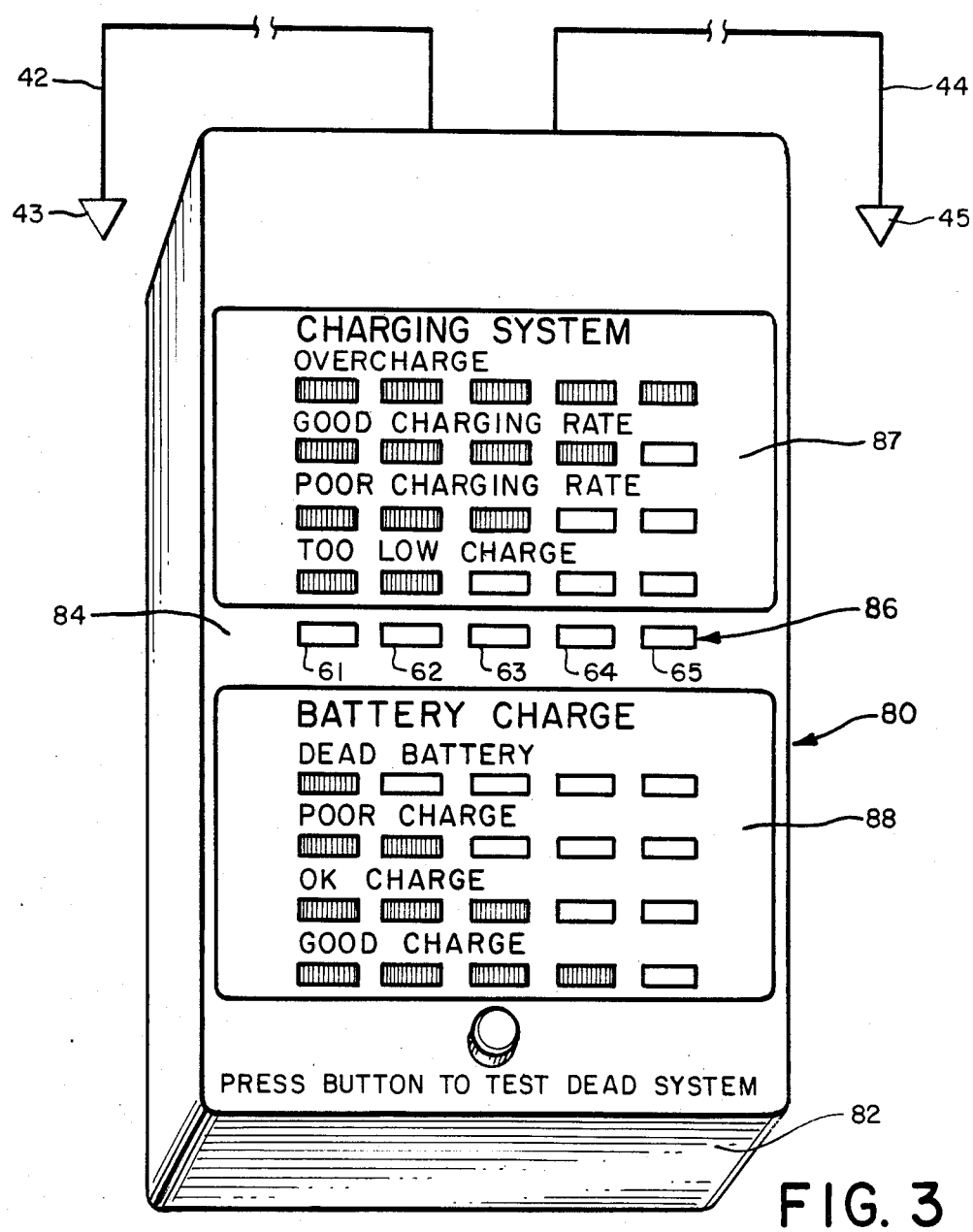
FIG. 3 is a perspective view of a housing having indicia displayed thereon, incorporating exemplary circuitry usable with the apparatus and methods of the invention.

The package 80 for the circuitry described above is shown in FIG. 3. This package includes a housing 82 having a cover panel 84 carrying indicia means in the form of a first indicia 87 pertinent to the charging system of the charging vehicle, and second indicia 88 pertinent to the battery system of the vehicle to be charged. As shown in FIG. 3, first indicia 87 and second indicia 88 are representative of the array of diodes 61–65 and specifically represent several sequences in which they may be illuminated. Disposed between the first indicia 87 and the second indicia 88 is a window 86 aligned with diodes 61–65 inside housing 82. In this way the illuminated array of diodes 61–65 can be ascertained from the outside of housing 82 at any given time.

In a preferred method of operation, there is provided apparatus of the type shown in FIG. 2, particularly electronic means 30 having inputs 34a, 34b coupled to the battery 24 of the vehicle 20, and inputs 32a, 32b coupled to the electrical system 12 of the vehicle 10, Electronic means 30 further include circuit means 40 coupled to inputs 32a, 32b and 34a, 34b; and an array of illuminatable display means 60 in the form of diodes 61–65, coupled to the circuit means 30. The number of the diodes 61–65 in the array that are illuminated, and/or their sequence of illumination, is indicative of the extent to which battery 24 is recharged by the electrical system 12.

The inputs 32a, 32b are initially coupled via conductor 42 to the electrical system 12 of vehicle 10 via accessory outlet 18. Vehicle 10 is then started and preferably allowed to idle until it is warmed up. Switch 48, being normally closed, allows, voltage to be applied from the electrical system 12 to circuit means 40. With calibration means 50 adjusted for the parameters indicated above, the illumination of all five diodes (reference numerals 61–65) visible through window 86 of cover panel 84 is indicative of a voltage in excess of 15.8 volts being applied to circuit means 40. This is deemed excessive for recharging a battery, and for this reason the first indicia 87 (FIG. 3) shows a representation of five illuminated diodes bearing the label "overcharge". If only diodes 61–64 are illuminated, as visible through window 86 of cover panel 84, a voltage greater than 13.35 but less than 15.8 is necessarily being applied to circuit means 40. This is deemed sufficient to provide good battery charging, and for that reason first indicia 87 (FIG. 3) shows a representation of four illuminated diodes bearing the label "good charging rate". Similar representations and labels are shown on first indicia 87 for other ranges of voltages applied to circuit means 40 from the electrical system 12 of vehicle 10. With this arrangement, the user can be assured that the electrical system of the charged vehicle has sufficient energy to recharge the battery of the to-be-charged vehicle.

Assuming the voltage being generated by the electrical system 12 is sufficient for recharging a battery, such as battery 24 of vehicle 20, conductor 44 is then coupled to accessory outlet 28 in vehicle 20. This permits electrical energy to be passed from the electrical system 12 of vehicle 10, via normally closed switch 48, to battery 24 of vehicle 20. The progress at which battery 24 is being recharged can be ascertained periodically by operating switch 48. This, in turn, isolates the electrical system 12 from circuit means 40, whereby the voltage applied to circuit means 40 is derived virtually exclusively from battery 24.

When switch 48 is so operated, and the voltage applied from battery 24 is greater than 12.2 but less than 15.8, three diodes (diodes 61–63) will be illuminated. This is indicative that battery 24 is accepting a charge. Thus, second indicia 88 (FIG. 3) shows a representation of three illuminated diodes bearing a label "good charge". As with first indicia 87, second indicia 88 bears other diode representations and appropriate labels to indicate other stages of recharging for battery 24.

If the operation of switch 48 indicates that the battery 24 has been sufficiently recharged, conductors 42, 44 should be disengaged from their respective outlets 18, 28, and vehicle 20 can be started in the normal manner. If, on the other hand, the operation of switch 48 indicates that the battery 24 has not been sufficiently recharged, conductors 42, 44 should not be disengaged, and further recharging from the electrical system 12 of vehicle 10 should continue until battery 24 has been properly recharged. This, of course, can be readily ascertained by periodically operating switch 48 and comparing the array of illuminated diodes appearing in window 86 of cover panel 84 with the representations and labels of indicia 88.

In a further aspect of the invention, the condition of battery 14 in the charging vehicle 10 can be ascertained if desired. This is accomplished by turning off the engine of vehicle 10, disengaging conductor 44 from outlet 28 in the to-be-charged vehicle 20, and operating an electrical accessory, such as the headlights, from vehicle 10 off of its battery 14. Comparison of indicia 88 with the array of illuminated diodes visible through window 86 of cover plate 84 will enable and observer to quickly ascertain the condition of battery 14.

What has been disclosed is an improved method and apparatus for recharging a battery in a vehicle to be charged from the electrical system of a charging vehicle. Other improvements in battery charging techniques have also been disclosed. Though the methods and apparatus disclosed herein are preferred, numerous modification and variations of such methods and apparatus which do not part from the true scope of the invention will be apparent to those skilled in the art. Accordingly, all such modifications and variations are intended to be covered by the appended claims.

We claim:

1. A method for determining whether a battery in a first vehicle is charged from the electrical system of a second vehicle comprising the steps of:

providing electronic means having inputs adapted to be coupled to said battery and said electrical system, respectively, circuit means coupled to said inputs, and an array of illuminatable display means, coupled to said circuit means, the number of said display means in said array that are illuminated being indicative of the extent to which said battery has been charged;

coupling said electrical system to one of said inputs and coupling said battery to another of said inputs; and periodically interrogating said electronic means by momentarily isolating said electrical system from said circuit means to ascertain the number of said display means in said array that are illuminated.

2. The method defined in claim 1 wherein said display means are light emitting diodes and said array is a plurality of said diodes linearly arranged.

3. The method defined in claim 1 wherein said electronic means include switch means, disposed between said circuit means and the input couplable to said electrical system, and wherein said electronic means are periodically interrogated by operating said switch to isolate said electrical system from said circuit means.

4. The method defined in claim 1 further including the steps of coupling an electrical conductor between said battery and one of said inputs and coupling another electrical conductor between another of said inputs and said electrical system.

5. The method defined in claim 4 wherein each of said electrical conductors has a plug at one end thereof and each of said vehicles has an accessory outlet coupled, respectively, to said battery and said electrical system of said vehicles, whereby said electrical conductors are coupled thereto by connecting a respective plug into a respective outlet.

6. The method defined in claim 1 wherein the sequence of illumination of said display means in said array is indicative of the progressto which said battery has been recharged, and wherein said electronic means are periodically interrogated to ascertain said sequence.

7. A method for charging the battery of a first vehicle from the electrical system of a second vehicle, said first and second vehicles having, respectively, a first and a second accessory outlet coupled, respectively, to said battery and said electrical system, comprising the steps of:

providing electronic means having first and second electrical conductors respectively engageable with said first and second outlets, a first and a second input respectively coupled to said first and said second electrical conductors, circuit means coupled to said inputs, switch means coupled between said circuit means and said second input operable to isolate said second electrical conductor from said circuit means, and an array of illuminatable display means coupled to said circuit means; the number of said display means that are illuminated being indicative of the condition of said electrical system for recharging said battery, and the extent to which said battery has been recharged;

ascertaining whether said electrical system is in condition for charging said battery by coupling said second electrical conductor to said second outlet in said second vehicle and inspecting said array; and ascertaining whether said battery has been recharged by coupling said first electrical conductor to said first outlet in said first vehicle, operating said switch, and inspecting said array.

8. The method defined in claim 7 further including the step of starting the engine of said second vehicle and allowing it to idle prior to coupling said second electrical conductor to said second outlet.

9. The method defined in claim 8 further including the steps of stopping said engine of said second vehicle after ascertaining whether said electrical system is in condition for charging said battery, turning on the headlights of said second vehicle and ascertaining the effectiveness of said electrical system, including the battery forming a portion thereof, by inspecting said array.

10. Apparatus for charging the battery of one vehicle from the electrical system of a second vehicle, said one vehicle having a first accessory outlet coupled to said battery and said other vehicle having a second accessory outlet coupled to said electrical system comprising:

housing means having first and second inputs;

a first electrical conductor coupled to said first input, adapted for coupling to said first outlet;

a second electrical conductor, coupled to said second input, adapted for coupling to said second outlet;

circuit means, disposed inside said housing means;

switch means coupled between circuit means and said second input operable to isolate said seond electrical conductor from said circuit means;

an array of illuminatable display means, the illumination therefrom being visible from outside said housing, coupled to said circuit means; the number of said display means that are illuminated being indicative of the extent to which said battery has been recharged; and indicia means, disposed on said housing, schematically representing alternative numbers of said display means that are illuminated.

11. The apparatus defined in claim 10 wherein said circuit means include driver means coupled to said display means, for illuminating different ones of said display means when said battery has been charged to predetermined voltage values.

* * * * *